United States Patent
Yoshii et al.

(10) Patent No.: US 6,764,972 B2
(45) Date of Patent: Jul. 20, 2004

(54) MOTHER GLASS COMPOSITION FOR GRADED INDEX LENS

(75) Inventors: Tetsuro Yoshii, Osaka (JP); Jun Yamaguchi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/973,816

(22) Filed: Oct. 11, 2001

(65) Prior Publication Data

US 2002/0065186 A1 May 30, 2002

(30) Foreign Application Priority Data

Oct. 11, 2000 (JP) .................................... P. 2000-310654

(51) Int. Cl.$^7$ .......................... G02B 3/00; C03C 3/097; C03C 3/064
(52) U.S. Cl. ............................. 501/63; 501/64; 501/65; 501/66; 501/67; 501/72; 501/73; 501/900; 359/652
(58) Field of Search ....................... 501/63, 64, 65–67, 501/69, 72, 73, 77–79, 900; 359/652, 653, 654

(56) References Cited

U.S. PATENT DOCUMENTS 4,038,090 A  *  7/1977  Gliemeroth ................ 428/212
4,495,298 A  *  1/1985  Yamagishi et al. ......... 359/654

FOREIGN PATENT DOCUMENTS

| EP | 0 287 345 A1 | 10/1988 | |
| EP | 841306 A | * 5/1998 | |
| EP | 0 918 235 A2 | 5/1999 | |
| JP | 63170247 A | * 7/1988 | ........... C03C/21/00 |
| JP | 63288931 A | * 11/1988 | ........... C03C/3/076 |
| JP | 01133956 A | * 5/1989 | ............. C03C/3/11 |
| WO | WO-2000/04409 A | * 1/2000 | |

OTHER PUBLICATIONS

Patent Abstracts of Japan (63170247).
Patent Abstracts of Japan (63288931).

* cited by examiner

*Primary Examiner*—David Sample
(74) *Attorney, Agent, or Firm*—Sughrue Mion, PLLC

(57) ABSTRACT

A compositional range for a mother glass composition for graded index lenses which has a desired refractive index and is less apt to be devitrified and to develop cracks upon ion exchange was obtained by incorporating at least a given amount of one or more ingredients which are selected from oxides of metal elements ranging from yttrium, atomic number 39, to tantalum, atomic number 73, and which are less apt to cause glass coloration into a glass based on $SiO_2$—$TiO_2$—$Li_2O$—$Na_2O$ and containing no lead oxide. In particular, a compositional range in which a large angular aperture is obtained and devitrification is less apt to occur was obtained by incorporating $Ta_2O_5$ and $ZrO_2$ in a specific proportion and in specific amounts.

10 Claims, No Drawings

MOTHER GLASS COMPOSITION FOR GRADED INDEX LENS

BACKGROUND OF THE INVENTION

1. Field of the Invention

The present invention relates to a glass composition suited for producing graded index lenses having a refractive index gradient in their cross sections. More particularly, the invention relates to a mother glass (i.e., homogeneous glass before ion exchange) composition for graded index lenses which is excellent in drawability and ion-exchanging properties.

2. Description of the Related Art

A graded index lens is a rod lens having such a refractive index distribution in its cross section that the refractive index changes from the center toward the periphery. It has many advantages, for example, that it has an image forming action even when both sides thereof are flat and that it can be easily produced as a microfine lens. Because of such advantages, graded index lenses are recently used in optical systems in a wide range of applications such as copiers, facsimiles, LED array printers, and liquid-crystal shutter printers.

The graded index lens, usable in such a wide range of applications, is produced by an ion-exchange process in which a glass body containing a first cation capable of constituting a modifying oxide is brought into contact at a high temperature with a molten salt containing a second cation capable of constituting a modifying oxide to exchange the first cation in the glass body for the second cation in the molten salt and thereby form in the glass body a refractive index distribution in which the refractive index changes from the center of the glass body toward the periphery.

For example, it is known that subjecting a glass body containing cesium to ion exchange in molten potassium nitrate gives a graded index lens having excellent chromatic aberration (see JP-B-51-21594; the term "JP-B" as used herein means an "examined Japanese patent publication"). However, the angular aperture of this lens is as small as about 10° at the most. JP-B-59-41934 discloses a process for obtaining a graded index lens having a greater angular aperture, in which a glass body containing lithium is subjected to ion exchange in molten sodium nitrate. Also known is a mother glass composition capable of giving a graded index lens having an angular aperture of 13° or greater (see JP-A-7-88234; the term "JP-A" as used herein means an "unexamined published Japanese patent application").

However, experiments following Examples of JP-B-59-41934 revealed that the angular aperture is about 12° at the most and the Abbe's number, which is an index to dispersion of light, of the composition containing lead oxide is as small as less than 40. Furthermore, the Examples of JP-A-7-88234 indicate that the use of 5 mol % or more lead oxide, which was necessary for obtaining an angular aperture of 13° or greater, has made the mother glass show enhanced dispersion and have an Abbe's number less than 40.

In view of such conventional lenses and with the recent broadening of applications of graded index lenses, there is a desire for a lens showing reduced dispersion, i.e., a large Abbe's number, and having a large angular aperture.

SUMMARY OF THE INVENTION

An object of the invention, which eliminates the problems described above, is to provide a mother glass composition for giving a graded index lens which shows reduced dispersion, is highly suitable for mass-production, and has an angular aperture of 13° or greater.

The present inventors made intensive investigations in order to overcome the problems described above and, as a result, have found the following. A glass based on $SiO_2$—$TiO_2$—$Li_2O$—$Na_2O$ and containing no lead oxide can be obtained as a glass having a desired refractive index by incorporating thereinto at least a given amount of one or more ingredients which are selected from oxides of the metal elements ranging from yttrium, having an atomic number of 39, to tantalum, having an atomic number of 73, and excluding the lanthanides and which are less apt to cause glass coloration. Furthermore, this glass can be made less apt to suffer devitrification by incorporating $Ta_2O_5$ and $ZrO_2$ in a given proportion and regulating the total amount of $Ta_2O_5$, $ZrO_2$, and $Na_2O$ to a value not larger than a given amount. In addition, a glass which can readily undergo ion exchange at lower temperatures and is less apt to develop cracks can be obtained by incorporating $B_2O_3$ and $GeO_2$ in a total amount not smaller than a given value and thereby lowering the transition point.

The invention provides a mother glass composition for graded index lenses which comprises the following glass components:

40 to 60 mol % $SiO_2$,
2 to 12 mol % $TiO_2$,
2 to 22 mol % MgO,
12 to 20 mol % $Li_2O$,
2 to 13 mol % $Na_2O$,
0 to 10 mol % $GeO_2$,
0 to 10 mol % $B_2O_3$, and
0 to 5 mol % $Al_2O_3$, and further comprises:

0 to 5 mol % ZnO,
0 to 7 mol % $Y_2O_3$,
0 to 7 mol % $Nb_2O_5$,
0 to 7 mol % $In_2O_3$,
0 to 7 mol % $ZrO_2$,
0 to 16 mol % BaO,
0 to 5 mol % $SnO_2$, and
0 to 7 mol % $Ta_2O_5$, provided that the total content of ZnO, $Y_2O_3$, $Nb_2O_5$, and $In_2O_3$ is from 0 to 10 mol %.

For inhibiting devitrification while maintaining a large angular aperture, it is desirable to regulate the contents of $ZrO_2$ and $Ta_2O_5$ to from 1 to 5 mol % and from 1 to 5 mol %, respectively, and to regulate the ratio of the $Ta_2O_5$ content to the $ZrO_2$ content to from 0.2 to 2.5.

For further inhibiting devitrification, it is desirable to regulate the total content of $ZrO_2$, $Ta_2O_5$, and $Na_2O$ to from 4 to 15 mol %, that of MgO, BaO, and $TiO_2$ to from 10 to 25 mol %, and the ratio of the MgO content to the BaO content to from 0.4 to 2.5.

Furthermore, for enabling ion exchange to be conducted at a lower temperature to facilitate heat treatment, it is desirable to regulate the total content of $GeO_2$ and $B_2O_3$ to from 2 to 15 mol %.

DETAILED DESCRIPTION OF THE INVENTION

EXAMPLES 1 TO 5

Mother glasses of Examples 1 to 5 respectively having the compositions shown in Table 1 were prepared as glass rods (diameter, 1.1 mm) and examined beforehand for refractive index, Abbe's number, and devitrification temperature. The glass rods were treated in a molten sodium nitrate bath under the conditions shown in Table 1 to conduct ion exchange. The glass rods which had thus undergone ion exchange were examined for surface opacity and cracks. Lenses were produced from these glass rods and examined for lens performances including angular aperture.

Angular aperture was measured by the following method. First, each glass rod produced by the method described above was cut into appropriate lengths, and both sides of each cut rod were mirror-polished in parallel. A checkered pattern was brought into contact with one side of each cut glass rod, and the length at which an image of the checkered pattern was obtained from the other side was determined. A refractive index distribution coefficient $\sqrt{A}$ was calculated from that length. The angular aperture $\theta$ was calculated from the value of $\sqrt{A}$, the radius $r_0$ of the glass rod, and the refractive index $n_0$ of the glass before ion exchange according to the following equation.

$$\sin(\theta) = \sqrt{A} \cdot n_0 \cdot r_0$$

Refractive index was determined by the total reflection critical angle method with a Pulfrich refractometer. Abbe's number was calculated from the refractive indices as measured at the wavelengths of C-line (656.3 nm), d-line (587.6 nm), and F-line (486.1 nm).

Devitrification was examined in the following manner. The mother glass was crushed into particles having a diameter of about 1 mm and thoroughly washed with methanol. The particles were evenly put in a platinum boat of 200 mm in length, 12 mm in breadth, and 8 mm in depth, and this boat was held in a gradient furnace of 600 to 1,025° C. for 1 hour. Thereafter, the glass was examined for the development of devitrified parts. In the section "Devitrification" in Tables 1 to 5, the results of evaluation are shown by the following symbols:

A: no devitrification was visually observed,
B: slight devitrification was visually observed,
C: considerable devitrification was visually observed.

EXAMPLES 6 TO 10

Mother glasses respectively having the compositions shown in Table 2 were formed into glass rods in the same manner as in Examples 1 to 5, and the glass rods were evaluated in the same manner as in Examples 1 to 5. These glasses were less susceptible to devitrification than the glasses of Examples 1 to 5, while retaining almost the same angular apertures as in Examples 1 to 5.

EXAMPLES 11 TO 15

Mother glasses respectively having the compositions shown in Table 3 were formed into glass rods in the same manner as in Examples 1 to 10, and the glass rods were evaluated in the same manner as in Examples 1 to 10. These glasses were less susceptible to devitrification than the glasses of Examples 1 to 10. In addition, the lenses produced through ion exchange had better performances than those obtained in Examples 1 to 10.

EXAMPLES 16 TO 20

Mother glasses respectively having the compositions shown in Table 4 were formed into glass rods in the same manner as in Examples 1 to 15, and the glass rods were evaluated in the same manner as in Examples 1 to 15. These glasses were capable of ion exchange at a lower temperature than in Examples 11 to 15.

COMPARATIVE EXAMPLES 1 to 6

As apparent from Tables 1 to 4, the glass compositions according to the invention each had an angular aperture of 13° or greater and an Abbe's number, which is an index to dispersion, of 40 or more and were less susceptible to devitrification.

For comparison, Comparative Examples are shown in Table 5. Lenses and samples for various evaluations were produced through the same procedures as in the Examples. Although the angular apertures of the glasses of Comparative Examples 1 to 4 were not smaller than 10°, they were about 12° at the most. The compositions containing a lead compound had an Abbe's number, an index to dispersion, of less than 40, which is unfavorable for use as a lens. Furthermore, the glasses containing no lead compound and having an angular aperture of about 10° were extremely susceptible to devitrification. Moreover, in Comparative Examples 5 and 6, the Abbe's numbers were below 40 and the lens performances were insufficient, although angular apertures of 13° or greater were obtained.

Considering the results of the foregoing Examples overall, the desirable ranges of the contents of components of the mother glass composition are as follows.

$SiO_2$ is a main component forming the glass network structure. If the $SiO_2$ content is less than 40 mol %, the composition is apt to be devitrified. If it exceeds 60 mol %, the content of components serving to lower the melting temperature or to improve the refractive index is so limited that a practical glass cannot be obtained.

$Li_2O$ is one of the most important components for ion exchange. If the $Li_2O$ content is less than 12 mol %, the refractive index difference obtained by ion exchange is too small to obtain a practical glass having a sufficient angular aperture. If the $Li_2O$ content is more than 20 mol %, the glass is apt to be devitrified.

$Na_2O$ is essential for controlling the rate of ion exchange and lowering the melting temperature. If the $Na_2O$ content is less than 2 mol %, the rate of ion exchange considerably decreases and the melting temperature markedly increases. If it exceeds 13 mol %, chemical durability is reduced.

$TiO_2$ is essential for increasing the refractive index. If the $TiO_2$ content is less than 2 mol %, the desired effect cannot be obtained. If it exceeds 12 mol %, the glass tends to be devitrified.

MgO is essential for lowering the melting temperature and obtaining an increased refractive index difference through ion exchange. If the MgO content is less than 2 mol %, the incorporation of MgO is ineffective. If it exceeds 22 mol %, the glass tends to be devitrified.

BaO, although not essential, makes the glass less susceptible to devitrification when used in combination with MgO. However, BaO contents exceeding 16 mol % tend to result in devitrification.

ZnO, $Y_2O_3$, $ZrO_2$, $Nb_2O_5$, $In_2O_3$, $Ta_2O_5$, and $SnO_2$, although not essential, are effective in increasing the refractive index. In particular, when used not alone but in combination of two or more thereof, these components produce the effect of inhibiting devitrification. It should, however, be noted that if any one of these is incorporated in an amount exceeding 7 mol %, the glass is susceptible to devitrification. When two or more of ZnO, $Y_2O_3$, $Nb_2O_5$, and $In_2O_3$ are used in combination, the total content thereof should not exceed 10 mol %; otherwise the glass tends to be devitrified.

In particular, when the content of each of $Ta_2O_5$ and $ZrO_2$, among the aforementioned components effective in increasing the refractive index, is regulated to from 1 to 5 mol % and the ratio between the molar contents thereof ($Ta_2O_5/ZrO_2$) is regulated to a value of from 0.2 to 2.5, then a glass less susceptible to devitrification can be obtained.

Furthermore, when the total content of $Ta_2O_5$, $ZrO_2$, and $Na_2O$ is regulated to from 4 to 15 mol %, the total content of MgO, BaO, and $TiO_2$ is regulated to from 10 to 25 mol %, and the ratio between the molar contents of MgO and BaO (MgO/BaO) is regulated to from 0.4 to 2.5, then a mother glass hardly undergoing devitrification can be produced.

Moreover, regulating the total content of $GeO_2$ and $B_2O_3$ to from 2 to 15 mol % is effective in lowering the melting temperature and the ion exchange temperature in some degree. If the total content of $GeO_2$ and $B_2O_3$ is less than 2 mol %, the effect of lowering the melting temperature and ion exchange temperature is not produced. If the total content thereof exceeds 15 mol %, the glass comes to have a reduced angular aperture.

Besides the ingredients described above, CaO, SrO, and $K_2O$ may be added for lowering the temperature to be used for heat treatment. These optional ingredients may be incorporated in such an amount as not to enhance susceptibility to devitrification, i.e., up to 5 mol %.

TABLE 1

| (mol %) | Example No. | | | | |
|---|---|---|---|---|---|
| | 1 | 2 | 3 | 4 | 5 |
| $SiO_2$ | 60.0 | 54.0 | 54.0 | 49.4 | 51.0 |
| $TiO_2$ | 5.0 | 4.0 | 4.0 | 6.0 | 6.0 |
| MgO | 4.0 | 14.0 | 8.0 | 4.0 | 6.0 |
| BaO | 4.0 | 4.0 | 8.0 | 8.0 | 6.0 |
| $Li_2O$ | 13.0 | 15.0 | 15.0 | 18.0 | 15.0 |
| $Na_2O$ | 9.0 | 5.0 | 5.0 | 7.0 | 9.0 |
| ZnO | | | | | 1.2 |
| $Y_2O_3$ | | | | | |
| $In_2O_3$ | | | | 0.6 | |
| $ZrO_2$ | 0.0 | 1.0 | 1.5 | 5.5 | 5.0 |
| $Nb_2O_5$ | | | | | |
| $Ta_2O_5$ | 5.0 | 3.0 | 4.5 | 1.5 | 0.8 |
| $B_2O_3$ | | | | | |
| $GeO_2$ | | | | | |
| PbO | | | | | |
| $Ta_2O_5/ZrO_2$ | — | 3.0 | 3.0 | 0.3 | 0.2 |
| Ta + Zr + Na | 14.0 | 9.0 | 11.0 | 14.0 | 14.8 |
| Mg + Ba + $TiO_2$ | 13.0 | 22.0 | 20.0 | 18.0 | 18.0 |
| MgO/BaO | 1.0 | 3.5 | 1.0 | 0.5 | 1.0 |
| Refractive index | 1.648 | 1.649 | 1.673 | 1.668 | 1.675 |
| Abbe's number | 44.40 | 43.50 | 42.20 | 41.20 | 41.30 |
| Devitrification | C | C | C | C | C |
| Ion exchange | | | | | |
| Temperature (° C.) | 550 | 550 | 550 | 550 | 550 |
| Time (hr) | 80 | 70 | 78 | 63 | 60 |
| Opacity or cracks | observed | slight | slight | none | none |
| Angular aperture (°) | 13.3 | 13.4 | 13.7 | 15.8 | 13.1 |
| Lens performance | fair | good | good | good | good |

TABLE 2

| (mol %) | Example No. | | | | |
|---|---|---|---|---|---|
| | 6 | 7 | 8 | 9 | 10 |
| $SiO_2$ | 53.0 | 52.0 | 53.0 | 51.0 | 50.0 |
| $TiO_2$ | 10.0 | 6.0 | 3.0 | 4.0 | 10.0 |
| MgO | 6.0 | 4.0 | 6.0 | 6.0 | 8.0 |
| BaO | 2.0 | 11.0 | 6.0 | 6.0 | 8.0 |
| $Li_2O$ | 18.0 | 16.5 | 16.0 | 15.0 | 15.5 |
| $Na_2O$ | 5.0 | 5.0 | 10.0 | 10.0 | 3.0 |
| ZnO | | | | | |
| $Y_2O_3$ | | | | 1.0 | |
| $In_2O_3$ | | | | | |
| $ZrO_2$ | 3.0 | 2.5 | 4.0 | 5.0 | 3.0 |
| $Nb_2O_5$ | | | | | 1.0 |
| $Ta_2O_5$ | 3.0 | 3.0 | 2.0 | 2.0 | 2.5 |
| $B_2O_3$ | | | | | |
| $GeO_2$ | | | | | |
| PbO | | | | | |
| $Ta_2O_5/ZrO_2$ | 1.00 | 1.20 | 0.50 | 0.40 | 0.83 |
| Ta + Zr + Na | 11.0 | 10.5 | 16.0 | 17 | 8.5 |
| Mg + Ba + $TiO_2$ | 18.0 | 21 | 15.0 | 16 | 26 |
| MgO/BaO | 3.0 | 0.36 | 1 | 1 | 1 |
| Refractive index | 1.672 | 1.676 | 1.646 | 1.647 | 1.680 |
| Abbe's number | 42.20 | 41.29 | 44.63 | 44.52 | 40.85 |
| Devitrification | B | B | B | B | B |
| Ion exchange | | | | | |
| Temperature (° C.) | 550 | 550 | 550 | 550 | 550 |
| Time (hr) | 72 | 70 | 63 | 65 | 68 |
| Opacity or cracks | slight | none | none | observed | slight |
| Angular aperature (°) | 16.2 | 16.6 | 13.5 | 13.4 | 15.4 |
| Lens performance | fair | good | excellent | fair | good |

TABLE 3

| (mol %) | Example No. | | | | |
|---|---|---|---|---|---|
| | 11 | 12 | 13 | 14 | 15 |
| $SiO_2$ | 54.0 | 56.0 | 53.5 | 54.0 | 54.0 |
| $TiO_2$ | 8.0 | 6.0 | 4.0 | 4.0 | 4.0 |
| MgO | 5.0 | 6.0 | 11.0 | 8.0 | 9.0 |
| BaO | 7.0 | 6.0 | 5.0 | 8.0 | 7.0 |
| $Li_2O$ | 15.0 | 18.0 | 16.5 | 15.0 | 15.0 |
| $Na_2O$ | 5.0 | 2.0 | 4.0 | 5.0 | 5.0 |
| ZnO | | | | | |
| $Y_2O_3$ | | | | | |
| $In_2O_3$ | | | | | |
| $ZrO_2$ | 3.0 | 3.5 | 3.0 | 2.0 | 4.5 |
| $Nb_2O_5$ | | | | | |
| $Ta_2O_5$ | 3.0 | 2.5 | 3.0 | 4.0 | 1.5 |
| $B_2O_3$ | | | | | |
| $GeO_2$ | | | | | |
| PbO | | | | | |
| $Ta_2O_5/ZrO_2$ | 1.0 | 0.7 | 1.0 | 2.0 | 0.3 |
| Ta + Zr + Na | 11.0 | 8.0 | 10.0 | 11.0 | 11.0 |
| Mg + Ba + $TiO_2$ | 20.0 | 18.0 | 20.0 | 20.0 | 20.0 |
| MgO/BaO | 0.7 | 1.0 | 2.2 | 1.0 | 1.3 |
| Refractive index | 1.679 | 1.679 | 1.655 | 1.660 | 1.650 |
| Abbe's number | 40.20 | 41.50 | 43.30 | 43.40 | 45.20 |
| Devitrification | A | A | A | A | A |
| Ion exchange | | | | | |
| Temperature (° C.) | 550 | 550 | 550 | 550 | 550 |
| Time (hr) | 72 | 70 | 70 | 75 | 68 |
| Opacity or cracks | none | none | none | none | none |

TABLE 3-continued

| (mol %) | Example No. | | | | |
|---|---|---|---|---|---|
| | 11 | 12 | 13 | 14 | 15 |
| Angular aperture (°) | 16.7 | 15.5 | 14.0 | 14.2 | 13.2 |
| Lens performance | excellent | excellent | excellent | excellent | excellent |

TABLE 4

| (mol %) | Example No. | | | | |
|---|---|---|---|---|---|
| | 16 | 17 | 18 | 19 | 20 |
| $SiO_2$ | 52.0 | 53.0 | 51.5 | 51.0 | 51.0 |
| $TiO_2$ | 8.0 | 6.0 | 4.0 | 4.0 | 4.0 |
| MgO | 5.0 | 6.0 | 11.0 | 8.0 | 9.0 |
| BaO | 7.0 | 6.0 | 5.0 | 8.0 | 7.0 |
| $Li_2O$ | 15.0 | 18.0 | 16.5 | 15.0 | 15.0 |
| $Na_2O$ | 5.0 | 2.0 | 4.0 | 5.0 | 5.0 |
| ZnO | | | | | |
| $La_2O_3$ | | | | | |
| $Y_2O_3$ | | | | | |
| $In_2O_3$ | | | | | |
| $ZrO_2$ | 3.0 | 3.5 | 3.0 | 2.0 | 3.5 |
| $Nb_2O_5$ | | | | | |
| $Ta_2O_5$ | 3.0 | 2.5 | 3.0 | 4.0 | 2.5 |
| $B_2O_3$ | 2.0 | 3.0 | 2.0 | | |
| $GeO_2$ | | | | 3.0 | 3.0 |
| PbO | | | | | |
| $Ta_2O_5/ZrO_2$ | 1.0 | 0.7 | 1.0 | 2.0 | 0.7 |
| Ta + Zr + Na | 11.0 | 8.0 | 10.0 | 11.0 | 11.0 |
| Mg + Ba + $TiO_2$ | 20.0 | 18.0 | 20.0 | 20.0 | 20.0 |
| MgO/BaO | 0.7 | 1.0 | 2.2 | 1.0 | 1.3 |
| Refractive index | 1.669 | 1.666 | 1.646 | 1.652 | 1.644 |
| Abbe's number | 40.25 | 41.45 | 43.20 | 42.50 | 42.30 |
| Devitrification | A | A | A | A | A |
| Ion exchange | | | | | |
| Temperature (° C.) | 510 | 510 | 510 | 510 | 510 |
| Time (hr) | 72 | 70 | 75 | 80 | 70 |
| Opacity or cracks | none | none | none | none | none |
| Angular aperture (°) | 16.5 | 15.2 | 13.8 | 14.0 | 13.0 |
| Lens performance | excellent | excellent | excellent | excellent | excellent |

TABLE 5

| (mol %) | Comparative Example No. | | | | | |
|---|---|---|---|---|---|---|
| | 1 | 2 | 3 | 4 | 5 | 6 |
| $SiO_2$ | 50.0 | 30.0 | 50.0 | 45.0 | 52.0 | 55.0 |
| $TiO_2$ | 10.0 | 10.0 | 8.0 | 15.0 | 5.5 | 3.0 |
| MgO | 10.0 | 16.0 | 18.0 | 20.0 | 14.0 | 12.0 |
| BaO | | | | | 2.0 | 2.0 |
| $Li_2O$ | 8.0 | 10.0 | 8.0 | 12.0 | 11.5 | 12.0 |
| $Na_2O$ | 12.0 | 10.0 | 16.0 | 8.0 | 9.0 | 8.0 |
| ZnO | | | | | | |
| $La_2O_3$ | | | | | | 2.0 |
| $Y_2O_3$ | | | | | | |
| $In_2O_3$ | | | | | | |
| $ZrO_2$ | | | | | 1 wt % | 1 wt % |
| $Nb_2O_5$ | | | | | | |
| $Ta_2O_5$ | | | | | | |
| PbO | 10.0 | 4.0 | | | 6.0 | 6.0 |
| Other ingredients | | $B_2O_3$: 20 | | | | |

TABLE 5-continued

| (mol %) | Comparative Example No. | | | | | |
|---|---|---|---|---|---|---|
| | 1 | 2 | 3 | 4 | 5 | 6 |
| Refractive index | 1.652 | 1.623 | 1.596 | 1.631 | 1.641 | 1.640 |
| Abbe's number | 37.80 | 39.10 | | | 37.70 | 39.90 |
| Devitrification | A | B | C | C | A | B |
| Ion exchange | | | | | | |
| Temperature (° C.) | 520 | 520 | 520 | 520 | 490 | 490 |
| Time (hr) | 29 | 72 | 39 | 53 | 29 | 29 |
| Opacity or cracks | none | none | observed | observed | none | none |
| Angular aperture (°) | 10.0 | 11.4 | 11.5 | 11.2 | 14.0 | 14.8 |
| Lens performance | good | good | fair | good | good | good |

According to the invention, a mother glass for graded index lenses can be obtained which has an angular aperture of 13° or greater and reduced dispersion. Furthermore, by regulating the composition of this mother glass so as to be less susceptible to devitrification, drawability can be improved.

This application is based on a Japanese patent application JP 2000-310654 filed Oct. 11, 2000, the entire content of which is hereby incorporated by reference, the same as if set forth at length.

What is claimed is:

1. A mother glass composition for graded index lenses, which comprises the following glass components:

40 to 60 mol % $SiO_2$, 2 to 12 mol % $TiO_2$, 2 to 22 mol % MgO, 12 to 20 mol % $Li_2O$, 2 to 13 mol % $Na_2O$, 0 to 10 mol % $GeO_2$, 0 to 10 mol % $B_2O_3$, and 0 to 5 mol % $Al_2O_3$, and further comprises:

0 to 5 mol % ZnO, 0 to 7 mol % $Y_2O_3$, 0 to 7 mol % $Nb_2O_5$, 0 to 7 mol % $In_2O_3$, 1 to 5 mol % $ZrO_2$, 0 to 16 mol % BaO, 0 to 5 mol % $SnO_2$, and 1 to 5 mol % $Ta_2O_5$, provided that the total content of ZnO, $Y_2O_3$, $Nb_2O_5$, and $In_2O_3$ is from 0 to 18 mol %, the molar ratio of the $Ta_2O_5$ content to the $ZrO_2$ content is from 0.2 to 2.5, the molar ratio of the MgO content to the BaO content is from 0.4 to 2.5 and the mother glass composition does not contain lead oxide.

2. The mother glass composition for graded index lenses according to claim 1, wherein the total content of MgO, BaO, and $TiO_2$ is from 10 to 25 mol %.

3. The mother glass composition for graded index lenses according to claim 1, wherein the total content of $GeO_2$ and $B_2O_3$ is from 2 to 15 mol %.

4. The mother glass composition for graded index lenses according to claim 1, wherein the total content of $ZrO_2$, $Ta_2O_5$, and $Na_2O$ is from 4 to 15 mol %.

5. A graded index lens comprising a mother glass composition, wherein the mother glass composition comprises the following glass components:

40 to 60 mol % $SiO_2$,
2 to 12 mol % $TiO_2$,
2 to 22 mol % $MgO$,
12 to 20 mol % $Li_2O$,
2 to 13 mol % $Na_2O$,
10 to 10 mol % $GeO_2$,
0 to 10 mol % $B_2O_3$, and
0 to 5 mol % $Al_2O_3$,
and further comprises:
0 to 5 mol % $ZnO$,
0 to 7 mol % $Y_2O_3$,
0 to 7 mol % $Nb_2O_5$,
0 to 7 mol % $In_2O_3$,
1 to 5 mol % $ZrO_2$,
0 to 16 mol % $BaO$,
0 to 5 mol % $SnO_2$, and
1 to 5 mol % $Ta_2O_5$,
provided that the total content of $ZnO$, $Y_2O_3$, $Nb_2O_5$, and $In_2O_3$ is from 0 to 10 mol %, the molar ratio of the $Ta_2O_5$ content to the $ZrO_2$ content is from 0.2 to 2.5, the molar ratio of the MgO content to the BaO content is from 0.4 to 2.5 and the mother glass composition does not contain lead oxide.

6. The graded index lens according to claim 5, wherein the total content of MgO, BaO, and $TiO_2$ is from 10 to 25 mol %.

7. The graded index lens according to claim 5, wherein the total content of $GeO_2$ and $B_2O_3$ is from 2 to 15 mol %.

8. The graded index lens according to claim 5, which has an angular aperture of 13° or greater.

9. The graded index lens according to claim 5, which has an Abbe's number of at least 40.

10. The graded index lens according to claim 5, wherein the total content of $ZrO_2$, $Ta_2O_5$, and $Na_2O$ is from 4 to 15 mol %.

* * * * *